Figure 1:
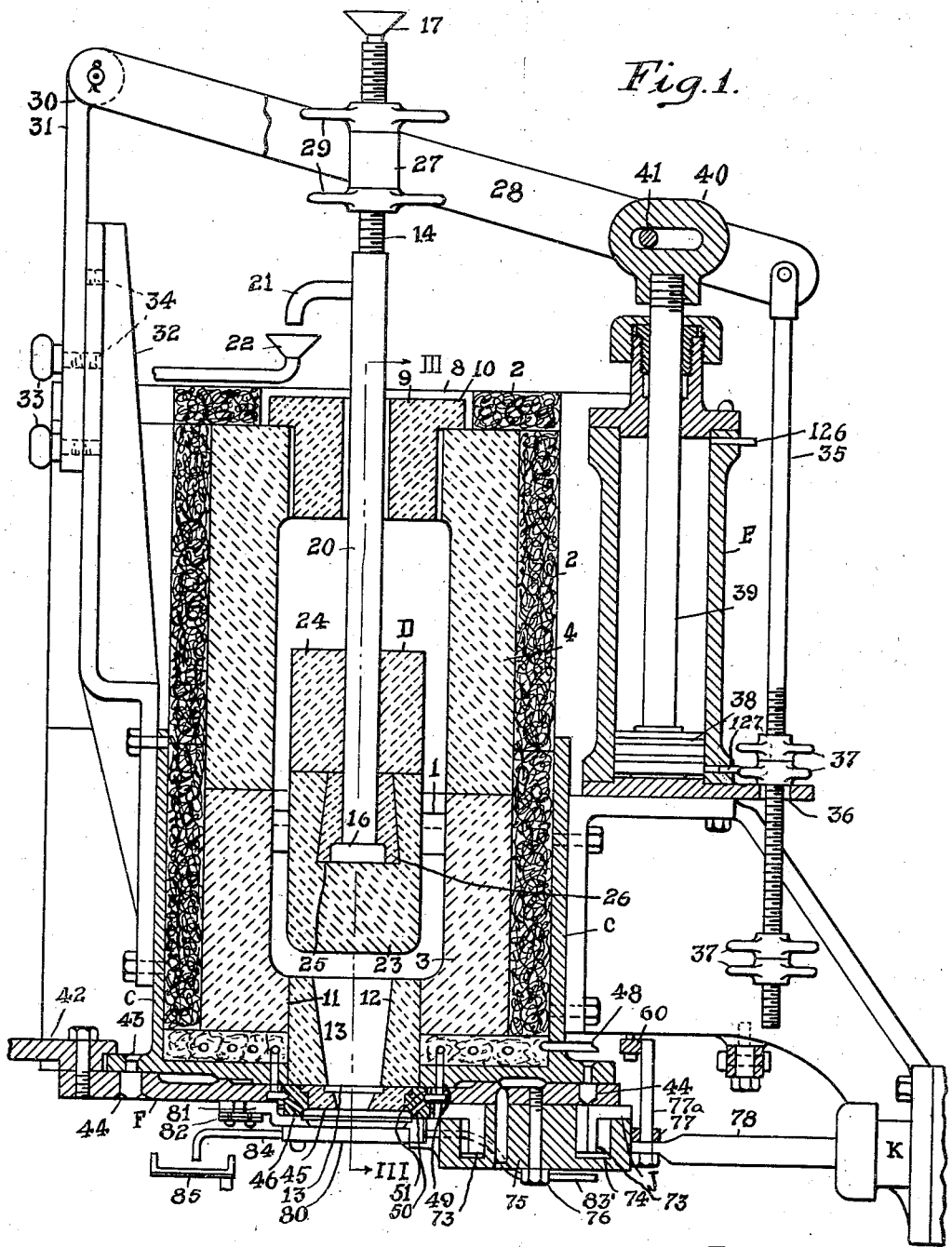

Sept. 20, 1927.

W. J. MILLER 1,642,967

APPARATUS FOR PRODUCING MOLD CHARGES OF MOLTEN GLASS

Original Filed Sept. 23, 1919    5 Sheets-Sheet 1

Inventor
Wm. J. Miller
by Robt. S. Brown
Attorney.

Sept. 20, 1927.  
W. J. MILLER  
APPARATUS FOR PRODUCING MOLD CHARGES OF MOLTEN GLASS  
Original Filed Sept. 23, 1919  5 Sheets-Sheet 2

Inventor  
Wm J. Miller  
by Robson A. Brown  
Attorney.

Sept. 20, 1927.

W. J. MILLER 1,642,967

APPARATUS FOR PRODUCING MOLD CHARGES OF MOLTEN GLASS

Original Filed Sept. 23, 1919    5 Sheets-Sheet 3

Inventor
Wm J. Miller
by Robt S. Brown
Attorney.

Sept. 20, 1927.
W. J. MILLER
1,642,967
APPARATUS FOR PRODUCING MOLD CHARGES OF MOLTEN GLASS
Original Filed Sept. 23, 1919    5 Sheets-Sheet 4
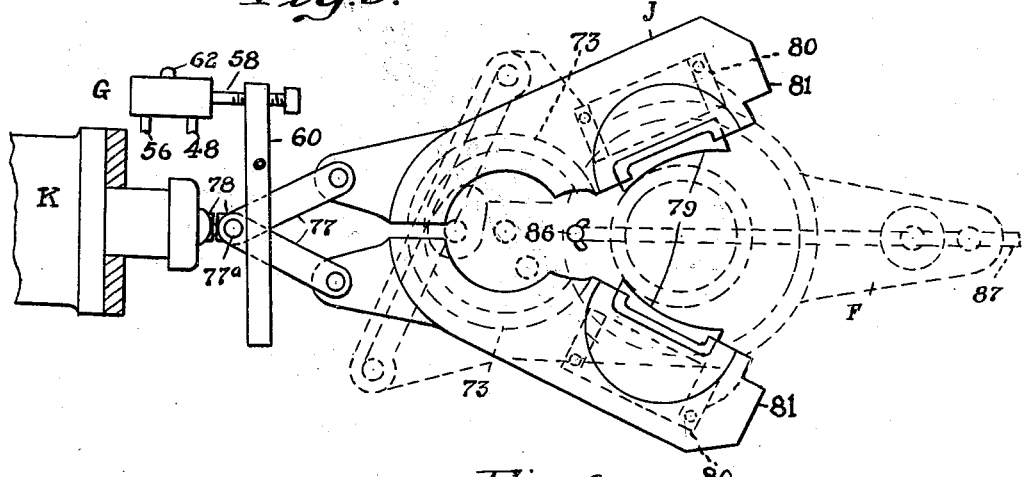
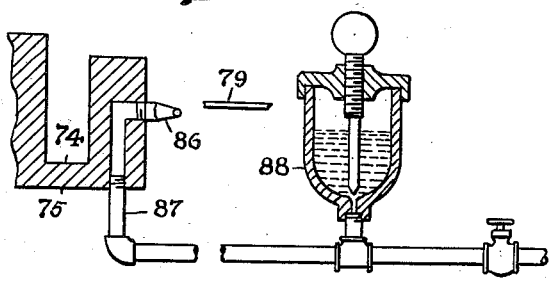
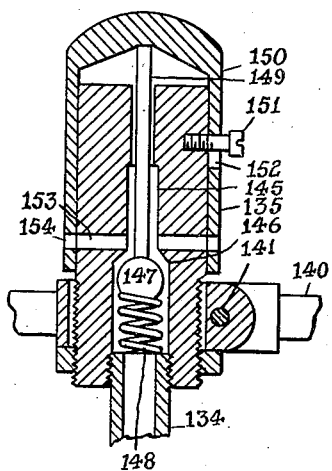
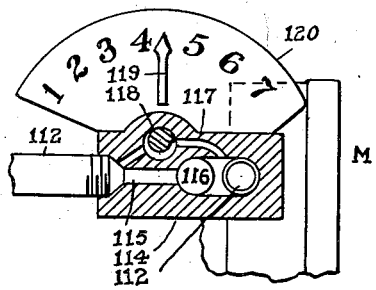
*Inventor*
*Wm J. Miller*
by *Robert S. Burns*
*Attorney.*

Sept. 20, 1927.  W. J. MILLER  1,642,967
APPARATUS FOR PRODUCING MOLD CHARGES OF MOLTEN GLASS
Original Filed Sept. 23, 1919    5 Sheets-Sheet 5
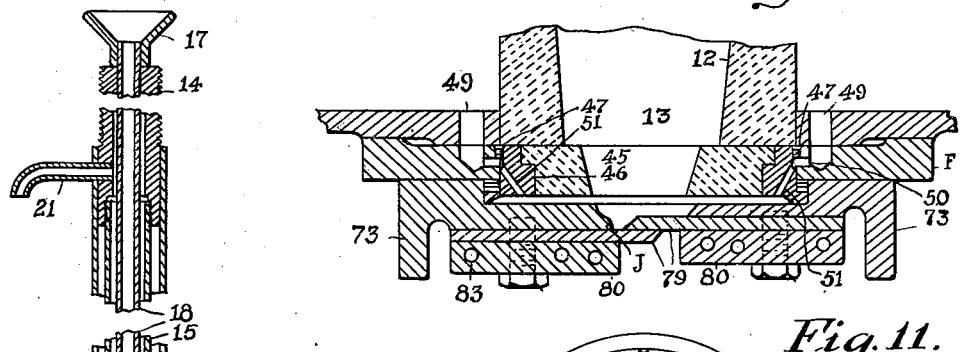
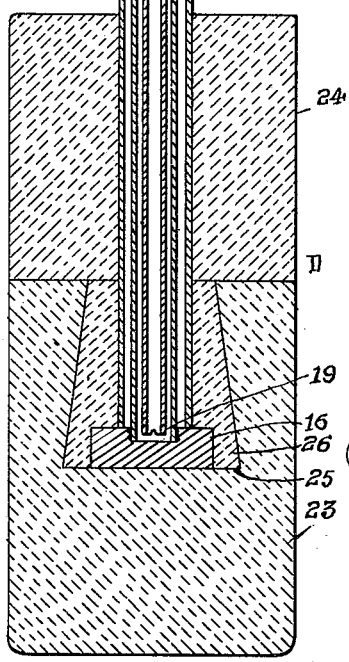
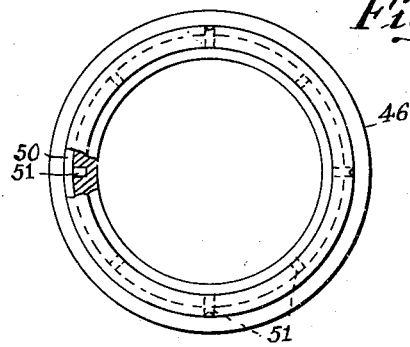
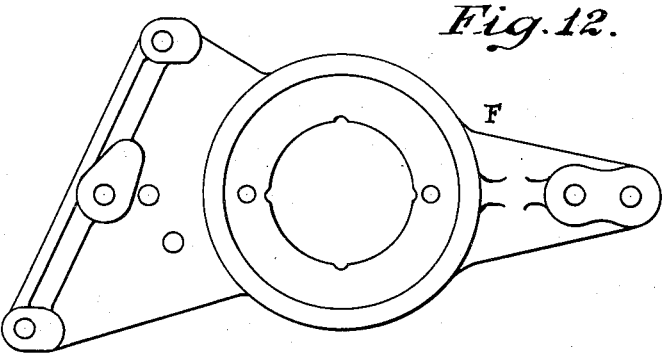

Patented Sept. 20, 1927.

1,642,967

UNITED STATES PATENT OFFICE.

WILLIAM J. MILLER, OF SWISSVALE, PENNSYLVANIA, ASSIGNOR TO HARTFORD-EMPIRE COMPANY, OF HARTFORD, CONNECTICUT, A CORPORATION OF DELAWARE.

APPARATUS FOR PRODUCING MOLD CHARGES OF MOLTEN GLASS.

Original application filed September 23, 1919, Serial No. 325,616. Divided and this application filed April 1, 1926. Serial No. 98,982.

This patent application is a division of my patent application Serial Number 325,616, filed in the United States Patent Office on September 23, 1919.

The object which I have in view is the provision of means automatic in action and arranged for proper timing whereby molten glass may be discharged from the container or tank at proper intervals and in the desired quantity and in proper condition and form for the pressing or other forming operation.

Generally speaking my improved mechanism presents the following characteristics.

The receptacle for the molten glass is provided with a discharge port or outlet for the outward flow of the glass, and associated with said port for the control of the discharge of glass from the port is a rigid implement or "plunger" to which is imparted a reciprocating motion to move it toward and away from the discharge port, and which when moving toward the port accelerates the discharge of the glass by forcing the glass out through the port, and when moved away from the discharge port tends to check and reverse the flow of glass in the port.

I associate shearing means with the plunger, for detaching the masses of glass extruded from the discharge port to permit the same to drop into the waiting mold or other container.

I also prefer to associate with the plunger and shears, means for directing against the severed neck of glass at the discharge end of the port a fluid-pressure blast whereby the sheared stub is forced inwardly along the discharge port into a zone of remelting heat to remelt and thus eliminate the hardened shear scar.

I preferably employ a blast of fluid-pressure of fixed or measured volume and progressively diminishing pressure to avoid driving the sheared stub back into the body of molten glass above the discharge port which would result in the formation of air-bubbles, streaks and other defects in the finished product.

I provide means for timing the relative operation of the plunger and shear mechanism.

I also provide means for properly timing the operation of the plunger mechanism, shearing means and fluid-pressure blast mechanism so that the glass is successively extruded from the discharge port, the extruded mass detached and the sheared stub is withdrawn back into the port at proper intervals to produce a succession of mold charges of the desired character.

Said timing means are arranged for adjustment, whereby the relation between the operations of the mechanisms may be varied.

I provide means whereby the timing of the different movements of the plunger and its speed of movement either toward or away from the plunger may be varied.

I provide a novel plug for the aperture in the roof of the container and through which the stem of the plunger protrudes.

Other novel features of construction, and also of arrangement of parts will appear from the following description.

Figure 2:
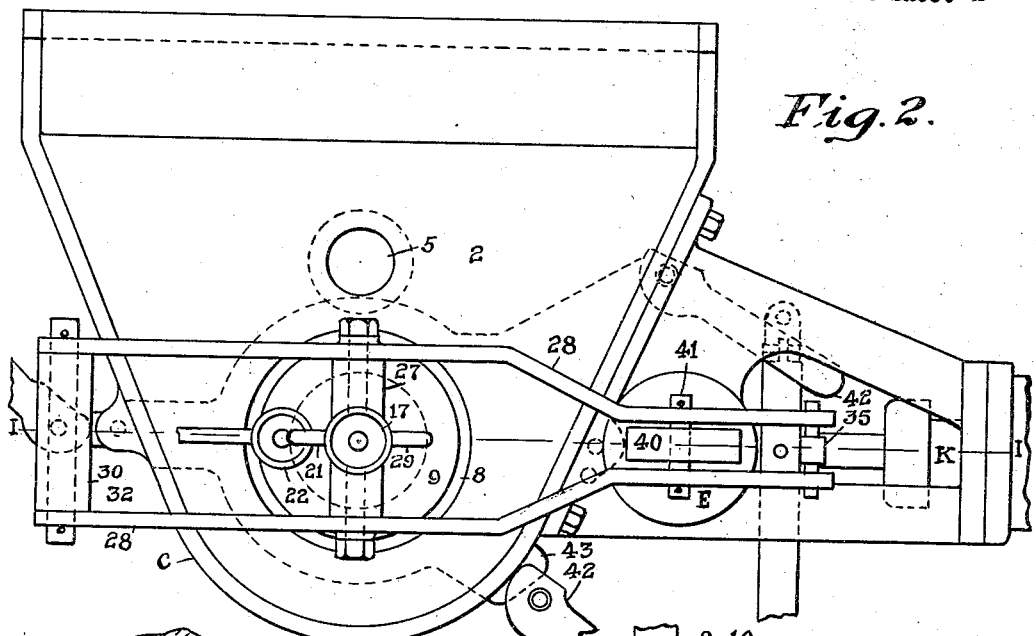
Figure 3:
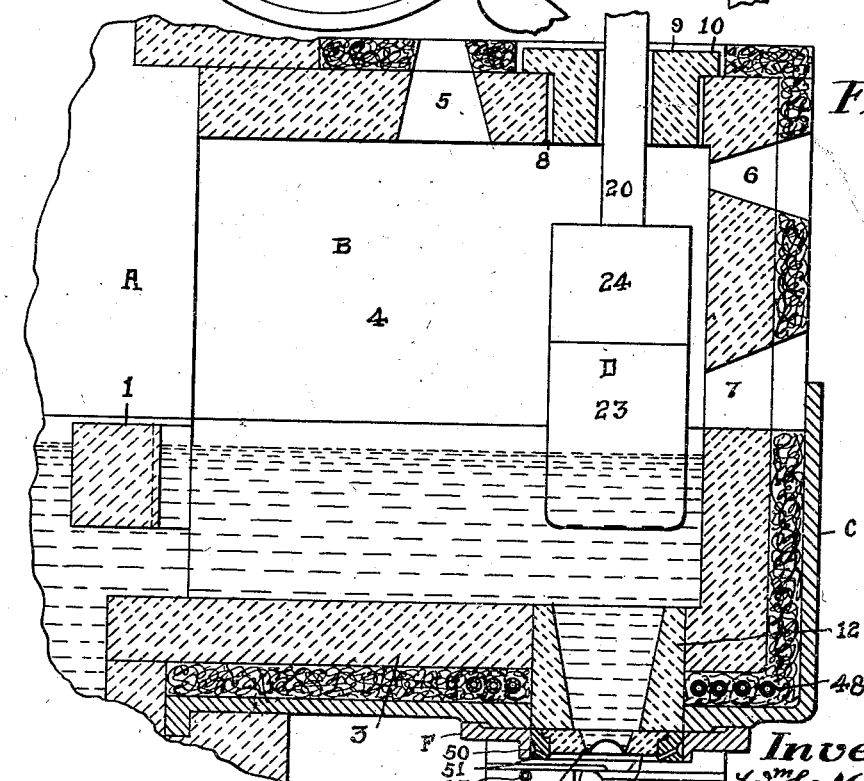
Figure 4:
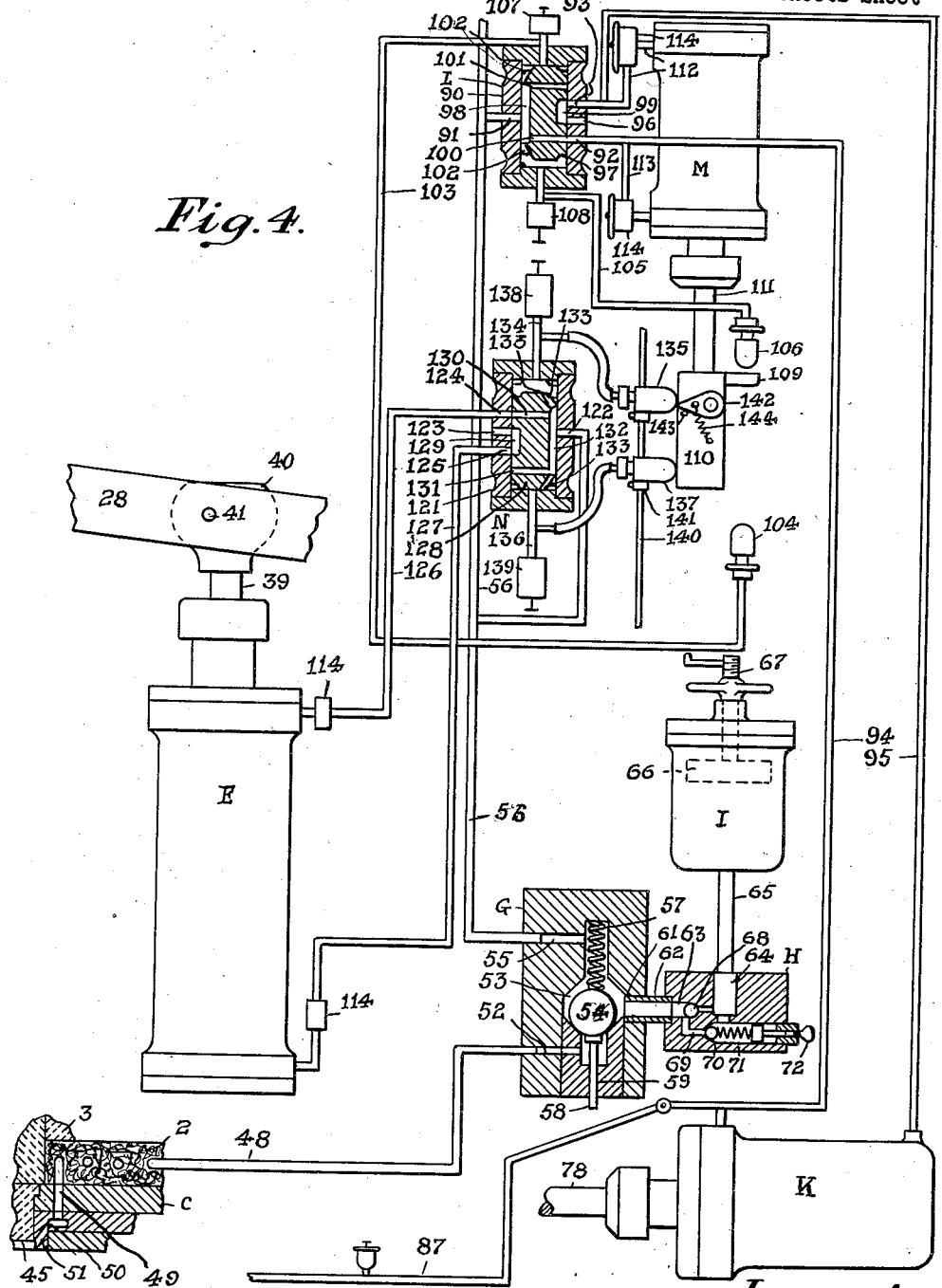

In the accompanying drawings, which are, however, merely intended to illustrate the principles of my invention without limiting the scope of the same to the construction shown, Fig. 1 is a vertical section of the boot of a glass tank or other container to which my invention has been applied, the view being taken in section along the line I—I in Fig. 2; Fig. 2 is a top plan view of the same; Fig. 3 is a vertical section taken along the line III—III in Fig. 1; Fig. 4 is a diagrammatic view of the fluid-pressure mechanism employed to operate my improved apparatus; Fig. 5 is a plan view showing the shear mechanism; Fig. 6 is a detail of the oil-spray mechanism for the shear blades; Fig. 7 is a longitudinal section of one of the hooded bleeder valves; Fig. 8 is a sectional view of one of the timer valves; Fig. 9 is an enlarged vertical section of the plunger; Fig. 10 is an enlarged sectional view of the outer end of the discharge port, the fluid-pressure blast ring and the shears, the latter being shown closed in Fig. 10 and open in Fig. 5; Fig. 11 is a plan view of the fluid-pressure blast ring, and Fig. 12 is a plan view of the bottom plate which carries the shear mechanism.

The following is a description of my invention as the same is illustrated in the drawings.

A represents a container for molten glass, hereinafter termed for convenience the "tank". B is a shallow extension or boot, a clay float 1 being interposed between the tank and its boot to prevent the entrance of scum into the boot. The boot is supported by a metal box C. The outer walls, floor and roof of the boot are composed of asbestos plates 2, while the inner walls, floor and roof are formed of clay tiles, the lining below the glass level being formed of flux tiles 3 while above the glass level the lining is formed of refractory tiles 4. The flux clay is used to resist the chemicals contained in the glass. 5 is an inwardly flared aperture in the roof of the boot so that a gas flame may be directed into the interior of the boot to heat up the same and its contents. 6 and 7 are peep holes in the front of the boot which are normally closed by suitable closures, not shown.

8 is an opening in the roof of the boot provided with an annular bushing 9 provided with a circumferential top flange 10 by which it is suspended in position.

11 is an opening in the bottom of the boot vertically alined with the opening 8, and provided with a clay bushing 12 whose bore is outwardly tapered forming the discharge port 13 of the boot. In the drawings, I have shown the discharge port in the bottom of the boot, whereby I am enabled to take advantage of the gravity flow of glass in discharging the same from the boot, but it will be understood that the discharge port may be horizontally positioned in the wall of the boot if desired, in which case the plunger would be axially alined therewith.

D is the plunger working in the boot B in axial alinement with the openings 8 and 11. As said plunger must be able to resist high temperatures without warping or breaking, I prefer to use the following construction for the same. The central stem or core is made up as follows. 14 is a cylindrical head having its upper portion exteriorly threaded while its lower bore is enlarged and interiorly threaded. 15 is a tube whose upper end is screwed into the lower bore of said head and whose lower end is screwed into a blind nut 16. 17 is a nipple resting on the top end of head 14 and into the lower end of which is screwed the upper end of a small tube 18 which depends within the tube 15 but stops short of the nut 16. The lower end of tube 18 is preferably longitudinally slotted, as at 19, to permit a free flow of water from tube 18. The tube 18 loosely fits the head 14 and tube 15, so as to leave an annular water passage around it. 20 is an outer casing or sleeve whose upper end is a drive fit on the lower end of head 14 while its lower end rests on the nut 16. 21 is a water escape pipe leading from the interior of the head 14 and having its outer end bent downwardly to form a spout which discharges into drain 22, as shown in Fig. 1. The upper end of the nipple 17 is flared to form a funnel to receive a constant supply of water from a supply line, not shown. Thus a continuous circulation of water is maintained down the central tube 18 and up the tube 15, thus preventing the burning out of the core of the plunger. This protection is assisted by the inclosed air chamber formed by the casing 20.

The body of the plunger is formed of cylindrical clay blocks 23 and 24. The bottom block is provided with a downwardly extending axial recess 25 which is downwardly expanding, and into which the stem of the plunger is inserted. A filling of clay 26 is then rammed into said recess which when hardened anchors the block firmly on the stem. The upper block 24 is provided with a central bore which fits the plunger core, as shown. The plunger is thus rigidly connected together, but the blocks may be replaced without difficulty in case of injury.

The upper stem protrudes through the bore of bushing 9 and the head 14 extends through a circular hole in the cross head 27 whose ends are pivotally journaled in the parallel walking bars 28. 29 are adjusting nuts screwed on the head 14 above and below the cross head whereby the plunger may be adjusted in relation to the walking bars. The walking bars 28 are connected together to move in unison.

At one end said walking bars are pivotally mounted on the protruding ends of a horizontal shaft journaled in a collar 30 on the upper end of a post 31 which is attached to the fixed bracket 32 by means of screws 33 inserted through holes in the post 31 and screwed into threaded holes 34 in the bracket 32. A plurality of said holes 34 are provided in the bracket 32 so that the post may be raised or lowered as desired, thus, when it is necessary to heat the boot by a flame directed through the port 5, the plunger may be elevated in the boot out of the way of the flame.

The throw of the walking bars, and thus the limits of movement of the plunger may be adjusted by means of a rod 35 pivoted to the other ends of the walking bars and depending through a hole 36 in an abutment, such as a fixed portion of the structure, nuts 37 being provided on said rod above and below said hole 36, thereby enabling me to adjust the limits of upward and downward movement of the plunger, as may be required and independently of each other.

The plunger is reciprocated in the following manner.

E is a vertically disposed fluid pressure cylinder mounted on the boot structure and provided with a piston 38 whose rod 39 protrudes through a gland in the upper end of the cylinder and is provided with a head 40 horizontally slotted to receive a pin 41 spanning the walking bars 28.

It is evident that when pressure is admitted to the lower end of cylinder E and relieved from its upper end, the plunger will be raised, and that the plunger will be lowered when pressure is admitted to the upper end and relieved from the lower end of said cylinder, the range of movement of said plunger being controlled by the adjustment of the nuts 37 on the rod 35. The downward movement of the plunger serves to force glass out through the discharge port 13 while the upward movement of said plunger will tend to suck the glass back into the port, thus reversing the flow.

F is the bottom plate, best shown in Fig. 12, which is detachably secured to the bottom of box C by means of its pivotal clamps 42 which engage flanges 43 on the box. 44 are centering dowels depending from the box C and engaging suitable holes in the plate F. The plate F is provided with a circular opening which is positioned beneath the discharge port when the plate is in position. 45 is a mouth ring of refractory material having a downwardly tapering bore to restrict the flow of glass, and said ring is held in position against the bottom of bushing 12 by means of the metal pressure blast ring 46 which is secured in the opening of plate F by means of screw bolts 47 which engage threaded holes formed half in the plate F and half in the ring 46.

48 is an air pipe leading into the asbestos plate 2 which forms the bottom of boot B and said pipe is coiled in said plate around the discharge port and discharges at several points at its inner extremity by means of passages 49 into a circumferential groove 50 in the perimeter of blast ring 46 from which a plurality of inclined ports 51 lead into the outer bore of said blast ring, which bore is preferably slightly flared at its lower end. The coiling of the pipe 48 around the discharge port heats the compressed air for the blast and thus prevents chilling the glass.

The pipe 48 is connected to discharge port 52 of the operating valve G at one end of the chamber 53 of the double acting ball valve 54. The other end of said chamber 53 is provided with an inlet port 55 which is connected to the constant fluid pressure supply pipe 56. The ball valve 54 is normally held in position to close the port 52 by a helical spring 57 but may be shifted to close the inlet port 55 and open the outlet port 52 by means of its stem 58 protruding from the packed opening 59 in the valve casing. The stem 58 is tripped at the proper intervals by any convenient means such as the lever mechanism 60 which is actuated by the pivot pin 77ᵃ as the shears close, as will be later described.

Intermediate of its ends the chamber 53 is connected by a port 61 and pipe 62 with the port 63 in the pressure regulating valve H. The port 63 is connected with a second port 64 in valve H which last named port is connected by a pipe 65 with the pressure tank I whose internal capacity is adjustable by means of a false cylinder head 66 controlled by a screw shaft 67 extending through a threaded hole in the head of the tank. Between the ports 63 and 64 is a ball valve 68 opening toward the port 63, and 69 is a by-pass around said ball valve itself provided with a ball valve 70 opening toward the port 64 and held in place by a spring 71 whose tension is adjustable by means of a screw shaft 72.

It is evident that when the ball valve 54 is in the position shown in Fig. 4, the tank I will be filled with fluid pressure from the supply pipe 56, the fluid passing through the by-pass 69, and the amount of pressure being determined by the adjustment of the ball valve spring 71, while the volume of fluid will be determined by the adjustment of the false cylinder head 66. When the stem 58 of the ball valve 54 is pushed inwardly by the lever mechanism 60, the port 55 is closed, cutting off the admission of pressure and the contents of the tank I will be discharged through the pipe 48 and the blast ring 46 in the form of a blast of fluid of predetermined volume and progressively diminishing pressure against the neck of glass which depends in the discharge port after the shearing operation, following the upward movement of the plunger, to withdraw the neck of glass along the discharge port into the zone of remelting heat to remove the shear scar. The maximum pressure at the beginning of the blast is sufficient to start the neck moving inwardly, thus overcoming the inertia, but as glass gathers momentum in its inward movement, the diminishing pressure of the blast is not sufficient to cause the glass to be driven back into the boot which would result in air bubbles and streaks.

The principle of the air blast of predetermined volume and progressively diminishing pressure is the subject of Letters Patent of the United States No. 1,260,428, granted to me on March 26th, 1919.

I will now describe the shearing mechanism by means of which the gather of glass is detached from the glass protruding from the discharge port.

J represents a pair of coacting shear arms whose preferred form is best illustrated in Fig. 5, wherein they are shown open in full lines and plate F in dotted lines. Said arms J are pivoted together and to the underside of the bottom plate F by means of their depending arc shaped, concentric pivot flanges 73 which fit in the annular circumferential trough 74 of the bearing block 75 which is secured to the underside of the plate F by a bolt 76, the central portion or hub of said block being sufficiently higher than the outer edge of its trough to provide clearance for the shear arms. The rear ends of the arms J are connected by links 77 to the end of piston rod 78 of the shear cylinder K, the retraction of said piston rod serving to spread said shear arms while the extension of said piston rod closes said arms together. 77ª is the pin connecting the links 77 to the piston rod.

The shear blades 79 are clamped on the arms J by means of plates 80 which are bolted in place. The cutting edges of said blades are slightly concaved, as shown in Fig. 5 and overlap when closed, as shown in Fig. 3. I prefer to convex said blades longitudinally of their cutting edges toward each other to obtain a better bite at the center. The front ends of the arms J are provided with lugs 81 which ride up on spring clips 82 when the shears are closed, said spring clips being attached to the underside of plate F to hold the shears snugly up in position and prevent sagging.

It is evident that the speed of travel of the shear blades decreases as they close and increases as they open.

The blade bearing ends of the shear arms are provided with interior water passages 83 which are connected up at the rear end with flexible water supply pipes 83' and at the front end are provided with protruding discharge spouts 84 which discharge into the fixed waste water trough 85.

I find that the spraying of small portions of oil upon the shear blades before they enter the glass greatly assists the shearing operation. For this purpose I provide the front of the bearing block 75 with a spray nozzle 86 which is connected with a fluid pressure pipe 87 provided with an oil dripper 88. The pipe 87 is connected to the pipe 94, to be later described, which supplies fluid pressure to the front end of the cylinder K, thus causing a spray of oil to be delivered on the shear blades as they open.

I will now proceed to describe the operation of the cylinder K. L is an automatic control valve having a cylindrical closed ended casing 90. A central port 91 is connected to the pressure supply pipe 56. At the opposite side said casing is provided with a pair of ports 92 and 93 connected by pipes 94 and 95 with the front and rear ends of the cylinder K, respectively. 96 is a waste port to atmosphere between the ports 92 and 93. 97 is the sliding valve body provided on one side with the groove 98 always in communication with the pressure port 91 and on its opposite side with a short groove 99 which connects the waste port 96 with either the port 92 or 93 according to the position of the body 97. Said body is also provided near either end with diametric passages 100 and 101, the passage 100 connecting the port 92 with the groove 98 and consequently with the pressure port 91 when the groove 99 connects the port 93 with the waste port 92, and the passage 101 likewise serving to connect the port 93 with the groove 98 and the pressure port 91 when the groove 99 connects the port 92 with the waste port 96. 102 are small bleeder passages connecting the ends of groove 98 with the ends of the casing 90. The end of the casing adjacent to the port 93 is connected by a pipe 103 with a hooded bleeder valve 104 and the other end of said casing is connected by a pipe 105 with an opposed hooded bleeder valve 106. The pipes 103 and 105 are provided with manually operated bleeder valves 107 and 108 respectively so that the valve L can be operated by hand in adjusting the mechanism.

109 is a finger mounted on the head 110 of the piston rod 111 attached to the piston of the fluid pressure cylinder M whose inner end is connected by pipe 112 with the pipe 95 and whose outer end is connected by pipe 113 to the pipe 94. 114 represent timing valves in the pipes 112 and 113 which serve to regulate the escape of pressure from the cylinder and thus provide means for timing the action of said cylinder by regulating the speed of travel of the piston in the cylinder.

Similar timing valves 114 are provided at each end of the plunger-operating cylinder E.

The construction of said valves is shown in detail in Fig. 8 wherein the valve body 114 is provided with an L-shaped passage 115 into the extremities of which the threaded ends of the pressure pipe, say pipe 112, are screwed. 116 is a ball valve in said passage opening toward the cylinder M, thus not interfering with the admission of pressure to the cylinder but preventing its escape through the passage 115. 117 is a by-pass around the ball valve 116 whose capacity is adjustable by means of a rotary valve plug 118 whose stem protrudes from the valve body and is provided with a pointer 119 which moves on a quadrant scale 120. Thus, by adjusting the pointer on the scale the escape of pressure from the cylinder end may be adjusted with great nicety and the speed of travel of the piston thereby regulated.

It is evident that when the finger 109 on its outward travel opens the bleeder valve 104 and relieves the pressure in the end of the valve casing 90 of valve L the valve body will move into its position shown in Fig. 4, thus connecting the port 92 with pressure and the port 93 with exhaust, thereby thus admitting pressure in the front ends of the cylinders K and M, opening the shears and also causing the piston rod of the cylinder M to retract. When the finger 109 strikes the bleeder valve 106, the pressure is relieved in the opposite end of the valve L, causing the valve body to move out of the position shown in Fig. 4, whereby the port 93 is connected to pressure and the port 92 to exhaust, thus causing the piston rods of the cylinders K and M to move outwardly, closing the shears and causing the finger 109 to travel toward the bleeder valve 104. It is evident that the operation of the bleeder valves 104 and 106 may be timed by adjusting the valves 114. The bleeder valves are only temporarily opened and close immediately as the finger 109 moves out of contact with them.

The admission of pressure to the pipe 94, as has been explained, causes the oil spray to be discharged on the shear blades as they are opened.

The operation of the piston 38 in the cylinder E is controlled by the automatic valve N which is similar in principle to the valve L. Thus the cylindrical closed ended valve casing 121 is provided with a pressure port 122 connected to the fluid pressure supply pipe 56. On the opposite side is an exhaust port 123 and alined on either side of port 123 are ports 124 and 125, the port 124 being connected by a pipe 126 with the upper end of the cylinder E, while the pipe 127 connects the port 125 with the lower end of said cylinder. 128 is a valve body sliding longitudinally in said casing and provided on one side with a short groove 129 which connects either the port 124 or the port 125 with the exhaust port 123 according to the position of the valve body in one end or the other of the casing. 130 and 131 are a pair of diametric passages through the valve body so positioned that when the groove 129 connects the ports 123 and 125 the passage 130 connects the port 122 with the port 124, and when the groove 129 connects the ports 123 and 124, the passage 131 connects the port 122 with port 125. 132 is a groove in the valve body which connects the passages 130 and 131 always to the pressure port 122. The groove 132 is connected to the ends of the valve casing by small bleeder passages 133.

The end of the casing 121 adjacent to the port 124 is connected by a pipe 134 with a hooded bleeder valve 135, the outer portion of said pipe being a flexible hose. Similarly the other end of the casing is connected by a pipe 136 with a hooded bleeder valve 137, the outer portion of said pipe being flexible. Manually operated bleeder valves 138 and 139 are interposed in pipes 134 and 136, respectively, for operating the mechanism by hand. The bleeder valves 135 and 137 are adjustably mounted on a support 140 on which they may be slid to the desired positions and clamped in place by means of bolts 141. The bleeder valves 135 and 137 are interposed in the path of a finger 142, which is pivoted on the head 110 but is prevented from swinging in one direction by the pin 143 against which it is held resiliently by the spring 144. Thus as the head 110 moves toward the cylinder M it in turn trips the bleeder valves 137 and 135 but during the outward movement of the head the finger 142 trails over the bleeder valves without operating the same. When the bleeder valve 135 is opened by the finger 142, the pressure in the corresponding end of the valve N is relieved and the valve body moves out of its position shown in Fig. 4, connecting the port 125 to pressure, thus introducing pressure into the lower end of the cylinder E and elevating the plunger D, while the port 124 is connected to exhaust, relieving the pressure in the upper end of the cylinder E. Vice versa when the finger 142 opens the bleeder valve 137, pressure is admitted to the upper end of the cylinder E and relieved from the lower end of the same.

The characteristic construction of the hooded bleeder valves is illustrated in Fig. 7 wherein is shown a longitudinal section of the valve 135. The valve body is provided with an axial passage 145 into the outer threaded end of which is inserted the end of pipe 134. Intermediate of its ends said passage is provided with a seat 146 for the outwardly opening ball valve 147, held in place by spring 148 and whose stem 149 protrudes from the other or inner end of the passage 145. 150 is a hood sliding on the body of the valve and held in proper alinement by means of a set screw 151 fixed in the valve body and protruding through a slot 152 in the hood. The valve body is provided in the rear of the valve seat 146 with a diametric passage 153 which intersects the passage 145 and which registers with ports 154 in the hood when the latter is forced inwardly. It is evident that when the hood is forced inwardly, as has been explained in connection with the bleeder valves 104, 106, 135 and 137, the ball valve 147 will be open and the ports 154 will register with the cross passage 153, thus relieving the pressure in the pipe connecting the bleeder with the end of the automatic control valve and also in said end of the control valve. The hood is immediately forced outwardly by the spring 148 when the finger moves away from the hood, thus closing the bleeder, and allowing the pressure to again accumulate in the end of the control valve.

The operation of my process is as follows. The plunger is timed to force the glass out through the discharge port as the shears open and to begin its upward movement before the shears close, thus sucking the glass inwardly and attenuating the neck of glass by which the gather is suspended, thus greatly facilitating the shearing off of the gather. The upward movement of the plunger raises the sheared neck up into the blast ring and the blast from tank I is then admitted to the lower end of the discharge port, forcing the neck up into the zone of remelting heat for the removal of the shear scar. The initial pressure directed against the neck is sufficient to drive it in along the port but as the movement of the glass is accelerated, the pressure is progressively diminishing, so that the neck is not driven back into the body of molten glass, which would result in forming air bubbles and streaks. As the blast dies out the glass begins to flow out once more along the discharge port, and quickly responds to the downward stroke of the plunger. During the application of the blast the shears are closed, thus preventing dissipation of pressure.

In Letters Patent of the United States, 1,260,428, issued March 26th, 1918, I patented, inter alia, the use of a blast of compressed gaseous fluid of predetermined volume and progressively diminishing pressure for forcing the neck of glass inwardly along the discharge port for the purposes described, and the method therein described and claimed has been found very advantageous in practice. I find, however, that by associating with my improved air blast, the plunger mechanism, the formation and shearing of gathers is greatly facilitated and the desired character of gather may be obtained with great nicety.

The speed of the plunger and time during which the shears remain open and closed are important factors in the operation of the apparatus. The fluidity of the glass is another important factor. Thus the greater the fluidity the shorter the time during which the shears remain open, and also the shorter the stroke of the plunger and the nearer its approach to the inner end of the discharge port. The longer the stroke of the plunger and the farther from the inner end of the discharge port the plunger's nearest point of approach, the larger the gather produced.

This shows the importance of properly adjusting the timing valves 114 and the bleeder valves 135 and 137.

In practice my new apparatus has been found most advantageous, the mechanisms being capable, with proper synchronization and adjustment, of producing any desired form or character of gathers at any desired rate of speed.

What I desire to claim is:—

1. In combination with a container for molten glass provided with a discharge port, means coacting with said port for the discharge of glass therethrough at intervals, fluid pressure means for operating the latter, shearing means for severing gathers from the glass discharged from said port, fluid pressure means for operating said shearing means, a valve controlling the admission of power to said first named fluid pressure means, a second valve controlling the admission of power to said second named fluid pressure means, and means whereby the operation of one of said valves is timed by the operation of the other of said valves.

2. In combination with a container for molten glass provided with a discharge port, a plunger coacting with said port for the discharge of glass therethrough at intervals, fluid pressure means for operating said plunger, shearing means for severing gathers from the glass discharged from said port, fluid pressure means for operating said shearing means, a valve controlling the admission of power to said first named fluid pressure means, a second valve controlling the admission of power to said second named fluid pressure means, and means whereby the operation of said first named valve is timed by the operation of said second named valve.

3. In combination with a container for molten glass provided with a discharge port, a plunger coacting with said port for the discharge of glass therethrough at intervals, fluid pressure means for operating said plunger, shearing means for severing gathers from the glass discharged through said port, fluid pressure means for operating said shearing means, a fluid pressure-operated valve controlling the admission of power to said first named fluid pressure means, a second fluid pressure-operated valve controlling the admission of power to said second named fluid pressure means.

4. In combination with a container for molten glass provided with a discharge port, a plunger coacting with said port for the discharge of glass therethrough at intervals, fluid pressure means for operating said plunger, shearing means for severing gathers from the glass discharged through said port, fluid pressure means for operating said shearing means, a valve controlling the admission of power to said first named fluid pressure means, a second valve controlling the admission of power to said second named fluid pressure means, bleeder mechanism for each of said valves, and common means for actuating said bleeder mechanisms.

5. In combination with a container for molten glass provided with a discharge port, a plunger coacting with said port for the discharge of glass therethrough at intervals, fluid pressure means for operating said plunger, shearing means for severing gathers from the glass discharged through said port, fluid pressure means for operating said shearing means, a valve controlling the admission of power to said first named fluid pressure means, a second valve controlling the admission of power to said second named fluid pressure means, bleeder mechanism for each of said valves, common means for actuating said bleeder mechanisms, and means for varying the timed relation between the actuations of said bleeder mechanisms.

6. In apparatus for feeding molten glass in a succession of mold charges, the combination with a container for molten glass provided with a discharge outlet, of a vertically reciprocating implement to control the discharge of glass from said outlet, fluid pressure means for reciprocating said implement, shearing means for detaching mold charges from glass discharged through said outlet, fluid pressure means for operating said shearing means, a fluid-pressure actuated valve controlling the operation of the first mentioned fluid pressure means, a second fluid pressure actuated valve controlling the operation of the second mentioned fluid pressure means, and common means for controlling the supply of operating fluid to said fluid pressure actuated valves in a predetermined order and time.

7. In apparatus for feeding molten glass in a succession of mold charges, the combination with a container for molten glass provided with a discharge outlet, of a vertically reciprocating implement to control the discharge of glass from said outlet, fluid pressure means for reciprocating said implement, shearing means for detaching mold charges from the glass discharged through said outlet, fluid pressure means for operating said shearing means, a fluid-pressure actuated valve controlling the operation of the first mentioned fluid pressure means, a second fluid pressure actuated valve controlling the operation of the second mentioned fluid pressure means, common means for controlling the supply of operating fluid to said fluid pressure actuated valves, and means for varying the relative time of actuation of said valves.

8. In combination with a container for molten glass provided with a discharge outlet, a rigid reciprocating implement coacting with said outlet to control the discharge of glass through said outlet, shearing means for severing mold charges from the glass discharged from said outlet, fluid pressure means for operating said implement, fluid pressure means for operating said shearing means, a fluid-pressure operated valve controlling the admission of fluid pressure to the implement-operating fluid pressure means, a second fluid-pressure operated valve controlling the admission of fluid pressure to the shearing operating fluid pressure means, and automatic means for supplying operating fluid to said fluid pressure operated valves in predetermined time relation.

Signed at Pittsburgh, Pa., this 29th day of March, 1926.

WILLIAM J. MILLER.